Nov. 30, 1954     W. W. WARD     2,695,542
PISTON RING GROOVE CLEANER
Filed May 25, 1950

WOODROW W. WARD,
INVENTOR.

BY

Hazard & Miller
ATTORNEYS

United States Patent Office 2,695,542
Patented Nov. 30, 1954

2,695,542

PISTON RING GROOVE CLEANER

Woodrow W. Ward, Sherman Oaks, Calif.

Application May 25, 1950, Serial No. 164,270

2 Claims. (Cl. 82—4)

This invention relates to a piston groove cleaning apparatus which apparatus is also adapted to deepen the grooves of a piston by cutting into the piston.

A main object of the present invention is to provide a novel manner of supporting scraping or cutting means on a tool of the class described to permit easier scraping and cutting of piston grooves.

Another object of the present invention is to provide a novel manner of preventing rotation of the scraping or cutting means support when the device is used in scraping and cutting piston grooves.

Another object of the present invention is to provide opposed discs or disc members which are radially grooved to receive cutting or scraping means and which device is so constructed as to permit ready adjustment of the scraping means relative to the disc members.

Another object of the present invention is to provide a pair of opposed disc members having radial grooves for receiving cutting or scraping means and which cutting or scraping means are so supported by the disc members as to prevent rotation between the disc members.

Another object of the present invention is to provide a piston groove cleaning or scraping device in which the scraping means is so mounted and constructed as to allow grooves of different depths and widths to be readily cleaned in a manner heretofore not possible.

With the foregoing and other objects in view, which will be made manifest in the following detailed description and specifically pointed out in the appended claims, reference is had to the accompanying drawings for an illustrative embodiment of the invention, wherein:

Figure 1:
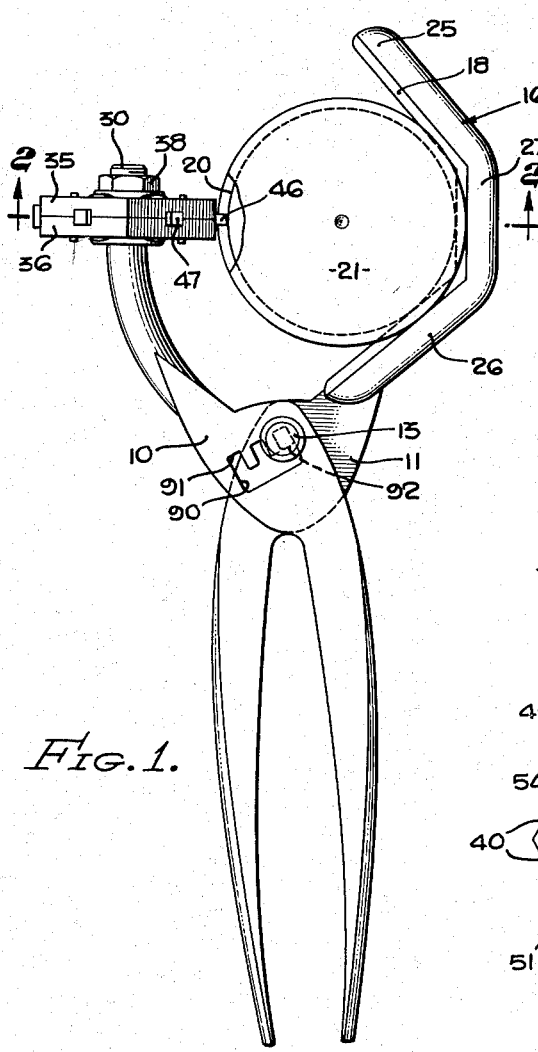
Figure 1 is a plan view showing a piston groove scraping or cleaning apparatus embodying the present invention as being applied to a piston.

Referring to the accompanying drawings wherein similar reference characters designate similar parts throughout, Fig. 1 shows a device embodying the present invention and comprising two handles 10 and 11 which are pivoted at 13 in a manner such as to allow not only swinging movement of handles 10 and 11 relative to one another but to permit an adjustment of the handles relative to one another to permit the device to be readily fitted to different diameters of pistons. It will be appreciated that the mere fact that the handles 10 and 11 are pivoted together allows the device to adapt itself to different sizes of pistons but an additional adjustment makes the adaptation of the device to different sized pistons more easily obtained and the operation of the device easier.

Figure 2:
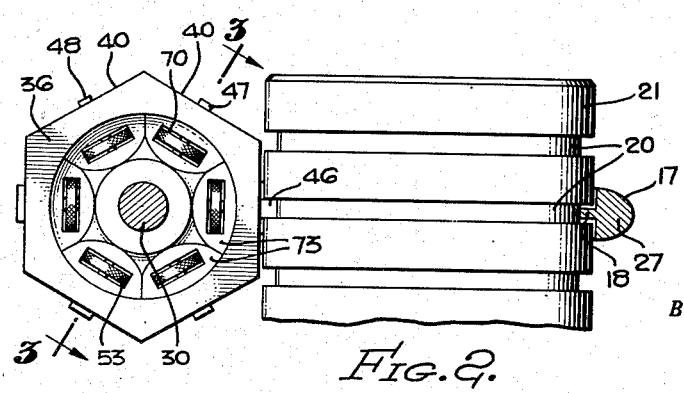
Fig. 2 is a sectional view in elevation along lines 2—2 of Fig. 1.

Handle 11 is provided with an arcuate jaw 16 having a curved rear face 17 as shown in Fig. 2 and a rib 18 which fits within a groove 20 in a piston 21 as shown in Fig. 2, and serves to guide the device around the piston during the scraping or cutting operation. Fig. 1 shows the preferable shape of the arcuate jaw 16 which is somewhat channel-shaped as viewed in Fig. 1 having two side angularly disposed portions 25 and 26 and a center joining portion 27. This type of construction allows the arcuate jaw 16 to readily ride on different sizes of pistons.

Figure 3:
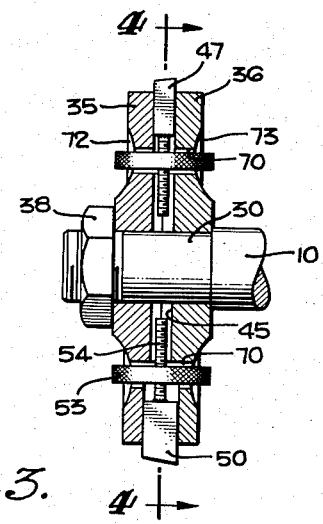
Fig. 3 is a sectional view along lines 3—3 of Fig. 2, showing the manner of mounting the scraping or cutting means.
Figure 4:
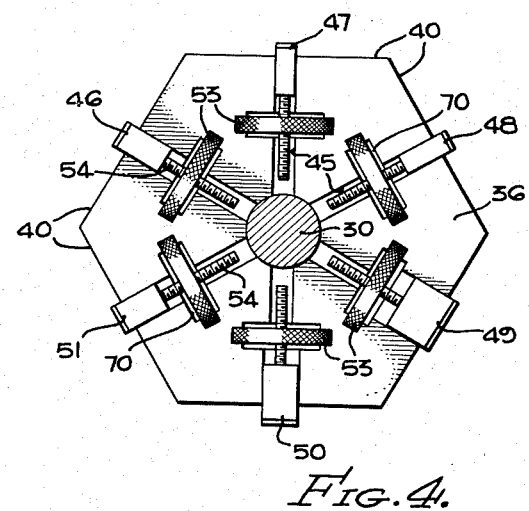
Fig. 4 is a sectional view along lines 4—4 of Fig. 3.

Handle 10 has a reduced end 30 which receives two opposed disc members 35 and 36 secured on handle 10 by a nut 38 which may take the form of a handwheel or thumb screw if desired, nut 38 being threadedly received by the end of reduced portion 30, as shown in Fig. 3.

The peripheries of disc members 35 and 36 have flats 40 provided thereon which flats are adapted to engage a piston lengthwise as shown in Fig. 2 to prevent rotation of the disc members relative to the reduced portion 30, and this construction serves to accurately center the scraping or cutting means relative to the grooves in which the scraping or cutting means is moved. Each of the disc members 35 and 36 is provided with opposed radial grooves 45 which provide ways for cutting or scraping means 46, 47, 48, 49, 50, and 51. The scraping or cutting means serves to prevent rotation between disc members 35 and 36 as well as performing their scraping or cutting functions. There are thumb screws 53 provided on threaded shanks 54 of the scraping means for adjusting the scraping means relative to the disc members whereby the different parts comprising the scraping means can be individually adjusted relative to the disc members so that a piston having different sized grooves therein can be readily cleaned by initially adjusting the scraping means to fit the different sized grooves and then merely cleaning the grooves in a predetermined successive manner by merely rotating the turret composed of disc members 35 and 36 to present a scraper which is disposed at the correct depth in the groove for proper cleaning. Therefore, it will be seen that if a number of pistons of similar design but each piston having a number of different sizes and types of grooves are to be cleaned the scrapers or cutters 46, 47, 48, 49, 50 and 51 can be adjusted prior to operation of the first piston so that the different scrapers or cutters are set at the desired depth for fitting within the grooves in the piston, and therefore, if scraper 47 happens to fit one of the grooves on each of the pistons it will be set at that correct depth and if each of the pistons has another groove in which scraper or cutter 49 fits, then this scraper or cutter will be set to scrap or cut at the proper depth and perhaps the scraper or cutter 51 may fit a third groove on the piston and it will be set for the proper depth. The pistons can, therefore, be quickly and readily cleaned without further adjustments of the scrapers or cutters, the only adjustment being required being the rotation of the disc members 35 and 36 to present the proper tool to the groove. Once the proper tool has been presented to the grooves there will be no rotation of the disc members 35 and 36 because of the flats 40 on the disc members which serve to positively prevent any such rotation.

The thumb nuts 53 which are mounted on threaded shank 54 fit within aligned recesses 70 in disc members 35 and 36 and there are relieved portions 72 and 73 provided on disc members 35 and 36 respectively to enable the thumb nuts to be more readily engaged by the operator of the device.

By the present invention therefore a novel manner of mounting scraping or cutting means for operation on a piston is provided which scraping or cutting means not only is supported in a novel manner but also serves itself to prevent rotation between the supporting members which support the scrapers or cutters.

Handles 10 and 11 as before brought out are connected for bodily adjusting movement relative to one another, and this adjusting means comprises an opening 90 through handle 10, as shown in Fig. 1 and having three pivot-containing minor recesses 91 in which a pivot 92 having flat sides is adapted to fit, pivot 92 being shown as positioned in the uppermost of the minor receiving recesses. It is obvious the pivot 92 can be moved downwardly into the opening 90 and fitted into any of the other recesses in handle 10. Pivot 92 is rotatably carried by handle 11.

Various changes may be made in the details of construction without departing from the spirit and scope of the invention as defined by the appended claims.

I claim:

1. A piston ring groove cleaner comprising a concave jaw adapted to partially receive a piston, a rib on the jaw adapted to partially enter a ring groove on the piston, an opposed jaw having a pair of opposed plates thereon rotatable about an axis at approximately right angles to the axis of the piston, said plates being peripherally flatted with flats any of which may be positioned against the piston, radial grooves in the opposed faces of the plates extending outwardly to adjacent the center of each flat, cutters slidable in the grooves, threaded stems on the cutters disposed in the grooves, adjusting nuts on the threaded stems edge portions of which extend outwardly through openings in the plates by which each cutter may be radially adjusted as to the distance it projects beyond its respective flat, and means connecting the jaws by which they may be moved towards each other.

2. A piston ring groove cleaner comprising two handle members pivotally connected together, an arcuate jaw on one handle member having a rib extending longitudinally thereof adapted to enter and slide in a piston ring groove on a piston positioned against the jaw, the other handle member having a jaw arranged in opposition to the first-mentioned jaw, a pair of discs rotatably mounted upon the last-mentioned jaw for rotation in planes approximately radial of the piston, said discs having flats engageable with the opposite side of the piston from that engaged by the arcuate jaw, and cutters of differing widths each being radially adjustable relative to the discs and arranged centrally of a flat whereby any cutter may be adjusted relative to its flat to make the proper depth of cut limited by the engagement of its flat with the side of the piston and by rotation of the discs on the arm a cutter of proper width may be selected and by pressing the handles together the selected cutter may be urged into a ring groove while the tool is moved about the piston relatively thereto.

References Cited in the file of this patent

UNITED STATES PATENTS

| Number | Name | Date |
|---|---|---|
| 601,506 | Eames | Mar. 29, 1898 |
| 839,045 | Straw | Dec. 18, 1906 |
| 1,195,297 | Vlchek | Aug. 22, 1916 |
| 1,430,604 | Wagner | Oct. 3, 1922 |
| 1,479,829 | Olson | Jan. 8, 1924 |
| 1,491,847 | Creed | Apr. 29, 1924 |
| 1,546,786 | Julian | July 21, 1925 |
| 1,577,155 | Anderson | Mar. 16, 1926 |
| 2,018,930 | Stromgren | Oct. 29, 1935 |
| 2,109,857 | Berkman | Mar. 1, 1938 |
| 2,412,748 | Phillips | Dec. 17, 1946 |
| 2,423,983 | Kis | July 15, 1947 |
| 2,480,456 | Ellison | Aug. 30, 1949 |